US010439791B2

(12) United States Patent
Kalhan

(10) Patent No.: US 10,439,791 B2
(45) Date of Patent: Oct. 8, 2019

(54) TIME DIVISION DUPLEX (TDD) COMMUNICATION CONFIGURATION FOR UNCONNECTED BASE STATIONS

(71) Applicants: Kyocera Corporation, Kyoto (JP); Amit Kalhan, San Diego, CA (US)

(72) Inventor: Amit Kalhan, San Diego, CA (US)

(73) Assignee: Kyocera Corporation, Kyoto (JP)

(*) Notice: Subject to any disclaimer, the term of this patent is extended or adjusted under 35 U.S.C. 154(b) by 0 days.

(21) Appl. No.: 15/751,057

(22) PCT Filed: Aug. 9, 2016

(86) PCT No.: PCT/US2016/046198
§ 371 (c)(1),
(2) Date: Feb. 7, 2018

(87) PCT Pub. No.: WO2017/027520
PCT Pub. Date: Feb. 16, 2017

(65) Prior Publication Data
US 2018/0234230 A1 Aug. 16, 2018

Related U.S. Application Data

(60) Provisional application No. 62/203,757, filed on Aug. 11, 2015.

(51) Int. Cl.
H04B 7/00 (2006.01)
H04L 5/14 (2006.01)
H04L 5/00 (2006.01)

(52) U.S. Cl.
CPC .......... *H04L 5/1469* (2013.01); *H04L 5/0035* (2013.01); *H04L 5/0044* (2013.01); *H04L 5/0053* (2013.01)

(58) Field of Classification Search
CPC ............. H04W 72/12; H04W 72/1226; H04W 72/1289; H04W 92/04
(Continued)

(56) References Cited

U.S. PATENT DOCUMENTS 6,804,527 B2 * 10/2004 Struhsaker ............ H04J 3/0694
370/350
8,797,895 B2 * 8/2014 Baba .................. H04B 7/15542
370/252

(Continued)

FOREIGN PATENT DOCUMENTS

WO WO 2010-061053 A1 6/2010

*Primary Examiner* — Dmitry Levitan

(57) ABSTRACT

In a time division duplex (TDD) communication system, an unconnected base station that is not directly connected to a core network transmits uplink backhaul signals to a connected base station when the unconnected base station is transmitting downlink signals to one or more user equipment (UE) devices and receives downlink backhaul signals from the connected base station when receiving uplink signals from one or more UE devices. After determining the transmission schedule of the connected base station, the unconnected base station selects a transmission schedule that is orthogonal to the connected base station transmission schedule. Depending on the particular implementation, the unconnected base station may be a repeater base station, a relay base station, or a self-backhauled base station.

20 Claims, 9 Drawing Sheets

(58) Field of Classification Search
USPC .............. 370/310, 315, 321, 322, 324, 327
See application file for complete search history.

(56) References Cited

U.S. PATENT DOCUMENTS

| | | | | |
|---|---|---|---|---|
| 8,886,205 | B2* | 11/2014 | Gaal | H04W 56/0045 |
| | | | | 455/450 |
| 8,917,650 | B2* | 12/2014 | Naden | H04B 7/155 |
| | | | | 370/315 |
| 9,014,073 | B2* | 4/2015 | Park | H04L 1/0003 |
| | | | | 370/312 |
| 9,118,468 | B2* | 8/2015 | Khandekar | H04L 5/16 |
| 9,408,091 | B2* | 8/2016 | Oh | H04W 88/04 |
| 9,425,914 | B2* | 8/2016 | Gan | H04W 16/26 |
| 9,504,084 | B2* | 11/2016 | Niu | H04B 15/00 |
| 9,628,252 | B2* | 4/2017 | Lahetkangas | H04B 7/2656 |
| 2007/0109962 | A1* | 5/2007 | Leng | H04B 7/15542 |
| | | | | 370/229 |
| 2010/0103860 | A1 | 4/2010 | Kim et al. | |
| 2013/0083710 | A1* | 4/2013 | Chen | H04W 72/042 |
| | | | | 370/281 |
| 2013/0322235 | A1 | 12/2013 | Khoryaev et al. | |
| 2013/0343241 | A1 | 12/2013 | Niu et al. | |
| 2014/0078943 | A1 | 3/2014 | Li et al. | |
| 2017/0208574 | A1* | 7/2017 | Ramakrishna | H04L 5/0055 |

\* cited by examiner

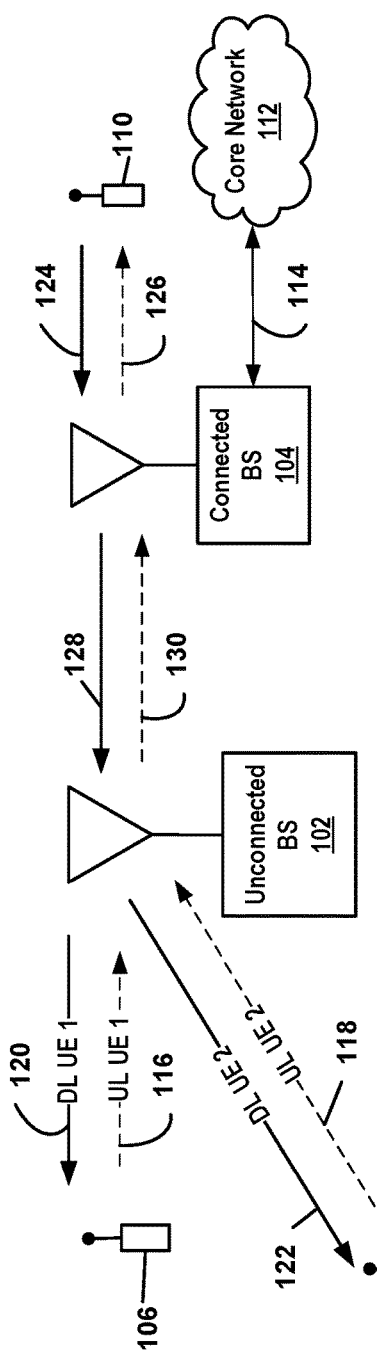
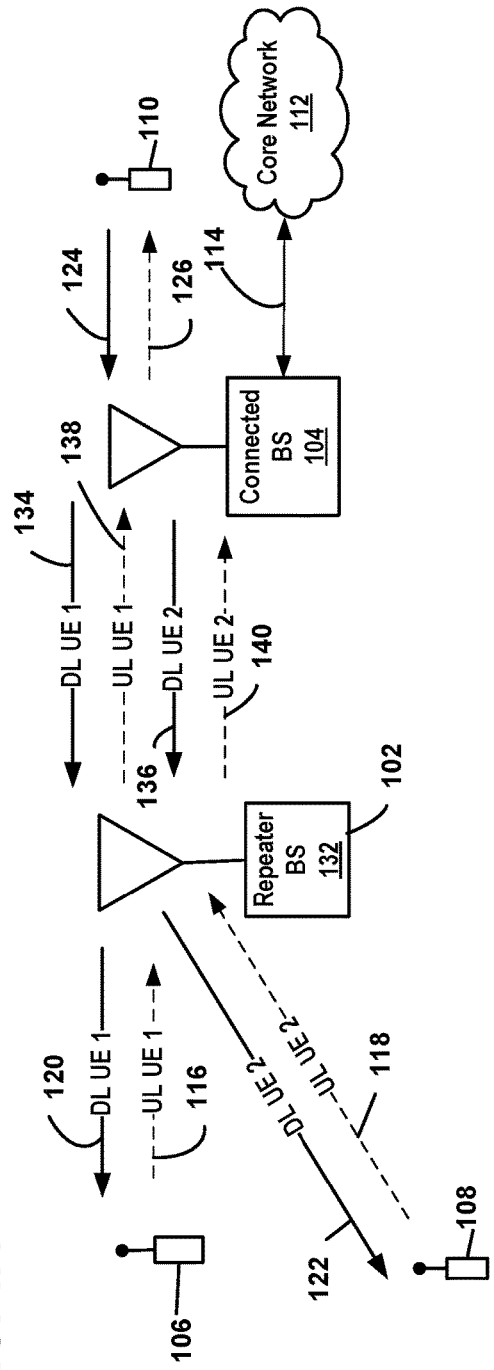
FIG. 1A
FIG. 1B

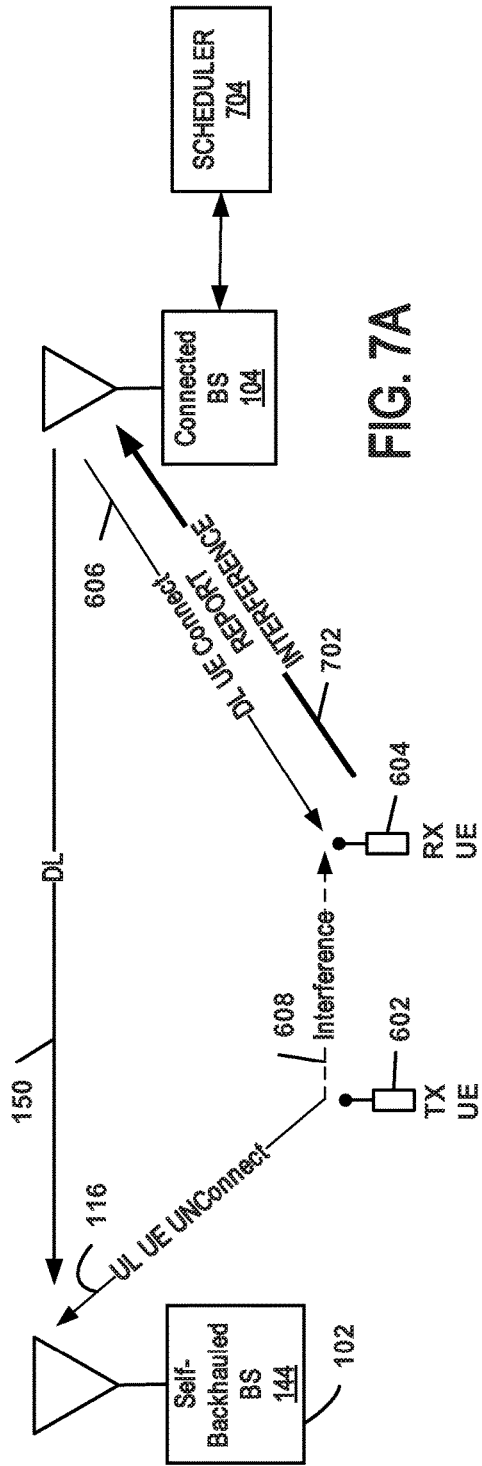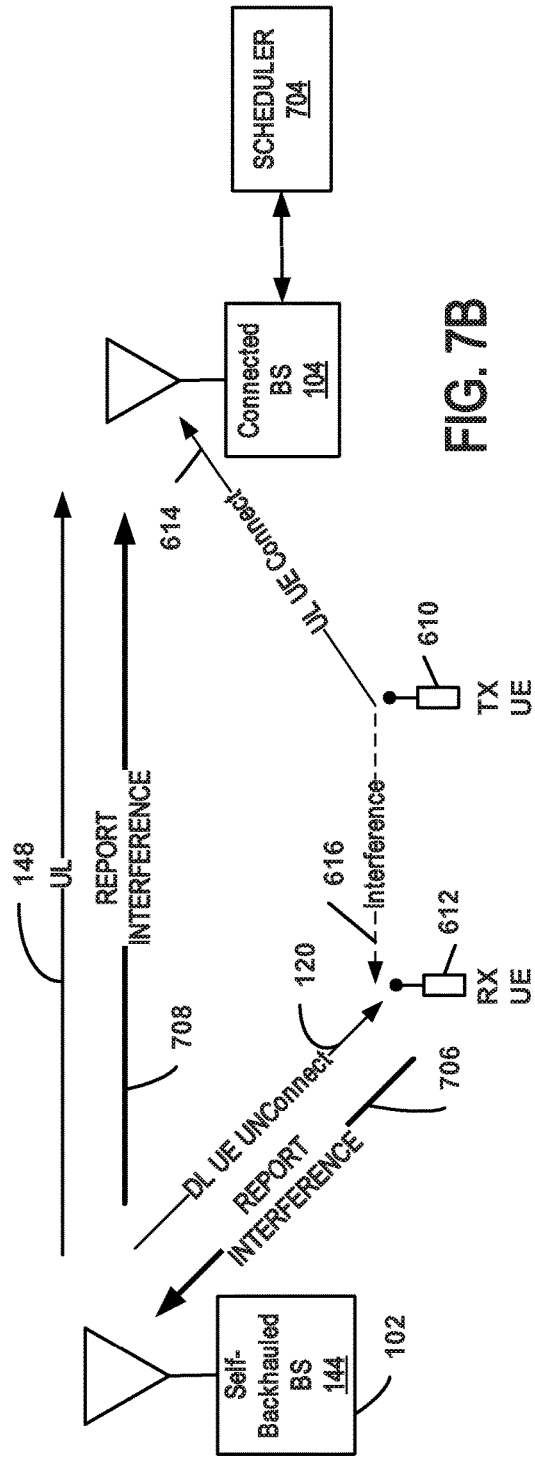

TIME DIVISION DUPLEX (TDD) COMMUNICATION CONFIGURATION FOR UNCONNECTED BASE STATIONS

CLAIM OF PRIORITY

The present application claims priority to Provisional Application No. 62/203,757 entitled "SHIFTED TDD CONFIGURATION SELF-BACKHAULING CELLS," filed Aug. 11, 2015, assigned to the assignee hereof and hereby expressly incorporated by reference in its entirety.

FIELD

This invention generally relates to wireless communications and more particularly to time division duplex (TDD) communication configuration for unconnected base stations.

BACKGROUND

Some communication systems utilize an unconnected base station, such as a repeater station, relay station or a self-backhauled station to facilitate the transfer of information between user equipment (UE) devices and a core network. The unconnected base station is not connected directly to the core network but still provides service to the UE devices by forwarding information to and from the UE devices and a connected base station which is connected to the core network. Where the unconnected base station is a repeater station, the repeater station simply retransmits downlink signals received from another base station to the UE device and retransmits uplink signals received from the UE device to the other base station. Relay stations and self-backhaul stations perform at least some signal processing before retransmitting the information. Although the unconnected base stations provide a mechanism for servicing UE devices without being connected to the core network, such systems often encounter the problem of self-interference. When the unconnected station attempts to receive a signal from the other base station in the same frequency band used to transmit a downlink signal to the UE device, radio frequency (RF) energy from the transmission may interfere with reception of the base station signal. Similarly, when the unconnected station attempts to receive an uplink signal from the UE device in the same frequency band used to transmit a signal to the other base station, RF energy from the transmission may interfere with reception of the uplink signal.

SUMMARY

In a time division duplex (TDD) communication system, an unconnected base station that is not directly connected to a core network transmits uplink backhaul signals to a connected base station when the unconnected base station is transmitting downlink signals to one or more user equipment (UE) devices and receives downlink backhaul signals from the connected base station when receiving uplink signals from one or more UE devices. After determining the transmission schedule of the connected base station, the unconnected base station selects a transmission schedule that is orthogonal to the connected base station transmission schedule. Depending on the particular implementation, the unconnected base station may be a repeater base station, a relay base station, or a self-backhauled base station.

BRIEF DESCRIPTION OF THE DRAWINGS

FIG. 1A is a block diagram of a time division duplex (TDD) system including an unconnected base station that is not directly connected to a core network.

FIG. 1B is a block diagram of the system where the unconnected base station is a repeater base station.

FIG. 7A is a block diagram for an example where UE device interference is reduced by communication resource management.

FIG. 7B is a block diagram for an example where UE device interference is reduced using a central scheduler.

DETAILED DESCRIPTION

Figure 1C:
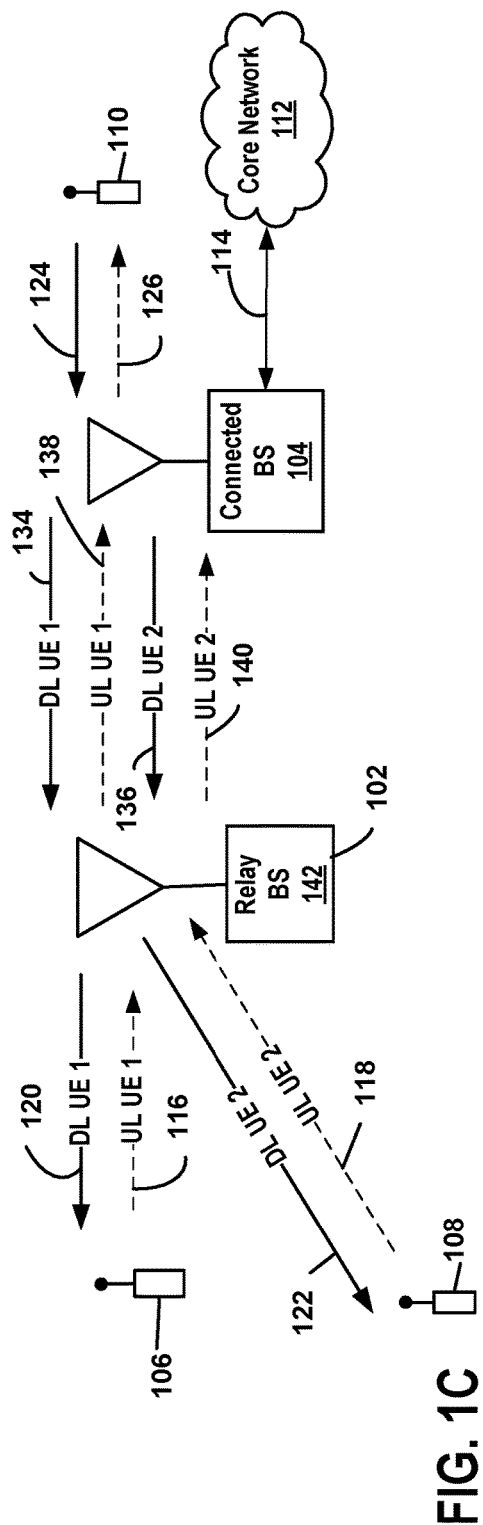
FIG. 1C is a block diagram of the system where the unconnected base station is a relay base station.

FIG. 1A is a block diagram of a time division duplex (TDD) wireless communication system 100 including an unconnected base station 102 and a connected base station 104. The unconnected base station 102 provides wireless communication service to one or more user equipment (UE) devices 106, 108 and the connected base station 104 provides wireless communication service to one or more UE devices 110. For the example of FIG. 1, the connected base station 104 is connected to a core network 112 through a backhaul 114. Although other techniques may be used, the backhaul 114 is typically a wired backhaul that may include cabling, wires, fiber optic cables, and electronic equipment. The unconnected base station 102 provides wireless communication service to the UE devices 106, 108 by receiving uplink signals 116, 118 from the UE devices 108, 110 and transmitting downlink signals 120, 122 to the UE devices 108, 110. The connected base station 104 provides wireless communication service to the one or more UE devices 110 by receiving uplink signals 124 from the UE devices 110 and transmitting downlink signals 126 to the UE devices 110. In the interest of brevity, only one UE device 110 is shown in FIG. 1 receiving service from the connected base station 104 although the base station may provide service to several UE devices.

The unconnected base station 102 is not connected to the core network 112 for the example and relies on a wireless connection with the connected base station 104 to facilitate communication between the UE devices 106, 108 and the core network 112. The unconnected base station 100 transmits downlink information 128 received from the connected base station to the UE devices 106, 108 and transmits uplink information 130 received from the UE device to the connected base station 104. As discussed below, the unconnected base station 102 may be a repeater station, a relay station, or a self-backhauled station. The techniques used for transmission and reception of the uplink and downlink information and the uplink and downlink signals depend on the type of unconnected base station in the system 100. As discussed below, repeater stations simply retransmit signals while relay stations and self-backhaul stations perform at least some signal processing functions.

FIG. 1B is a block diagram of the system 100 where the unconnected base station 102 is a repeater base station 132. As discussed herein, a repeater base station 132 retransmits signals without decoding or demodulating the signals. In other words, the signal processing performed by the repeater base station is limited to the radio frequency (RF) processing and may include RF amplifying and analog filtering the received signal before retransmission. As a result, each transmitted signal corresponds to a received signal and is essentially the same signal. Therefore, for the example of FIG. 1B, the repeater base station 132 receives, from the connected station 104, a first downlink signal 134 for the first UE device 106 and a second downlink signal 136 for the second UE device 108. The first downlink signal 134 is retransmitted to the first UE device 106 as the downlink signal 120. The second downlink signal 136 is retransmitted to the second UE device 108 as the downlink signal 122. The uplink signal 116 received from the first UE device 106 is retransmitted to the connected base station 104 as the first uplink signal 138. The uplink signal 118 received from the second UE device 108 is retransmitted to the connected base station 104 as the second uplink signal 140.

FIG. 1C is a block diagram of the system 100 where the unconnected base station 102 is a relay base station 142. As discussed herein, a relay base station 142 retransmits information in received signals with signal processing including decoding and/or demodulation of the received signals. The relay base station, therefore, can improve the quality of the retransmitted signals since the information is extracted and retransmitted without retransmitted received noise. The information is "cleaned up" before the information is retransmitted. As with the repeater base station, each transmitted signal corresponds to a received signal except that the relay base station performs baseband processing on the signals before transmission that typically includes amplification, filtering, interference cancellation/suppression. Therefore, for the example of FIG. 1C, the relay base station 142 receives, from the connected station 104, a first downlink signal 134 for the first UE device 106 and a second downlink signal 136 for the second UE device 108. The relay base station receives downlink signals and extracts the information. The relay base station 142 generates the downlink signal 120 where the information in the first downlink signal 134 is retransmitted to the first UE device 106 in the downlink signal 120. The relay base station 142 generates the downlink signal 122 where the information in the second downlink signal 136 is retransmitted to the second UE device 108 in the downlink signal 122. The information in the uplink signal 116 received from the first UE device 106 is retransmitted to the connected base station 104 in the first uplink signal 138. The information in the uplink signal 118 received from the second UE device 108 is retransmitted to the connected base station 104 in the second uplink signal 140.

Figure 1D:
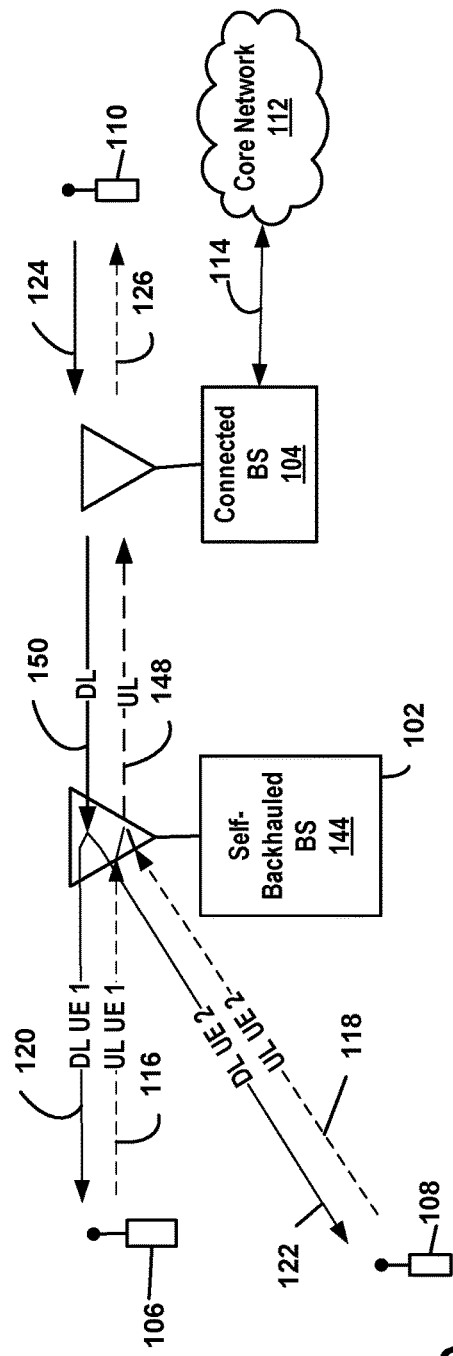
FIG. 1D is a block diagram of the system where the unconnected base station is a self-backhauled base station.

FIG. 1D is a block diagram of the system 100 where the unconnected base station 102 is a self-backhauled base station 144. As discussed herein, a self-backhauled base station 144 is a base station that utilizes the wireless connection to the connected base station 104 as a wireless backhaul. The self-backhauled base station autonomously provides wireless service to the UE devices. In other words, the connected base station 104 is not the serving station to the UE devices 106, 108 as is the case with relays and repeaters. The self-backhauling base station performs its own scheduling and control functions. In some circumstances, the self-backhauling base station appears as a UE device to the connected base station 104 and as a serving base station to the UE devices 106, 108. In other circumstances, the self-backhauling base station uses the communication resources of the connected base station to establish a wireless backhaul through the connected base station to the core network. In such situations, the self-backhauling base station is not treated as a UE device by the connected base station.

For the example of FIG. 1D, the self-backhauled base station 144 receives downlink signals 150 from the connected base station 104 that include information destined to the first UE device 106 and the second UE device 108. The self-backhauled base station 144 processes the downlink signals 150 to obtain the information for each UE device and uses the information to generate downlink signals for transmission to the UE devices 106, 108 that it is serving. Therefore, the self-backhauled base station 144, using the information in the downlink signal(s) 150, generates and transmits a first downlink signal 120 to the first UE device 106. A second downlink signal 122 is generated using the information in the downlink signal(s) 150 and transmitted to the second UE device 108. Information in the first uplink signal and the second uplink signals is obtained from the signals and forwarded to the connected base station 104 in one or more uplink signals 148.

Figure 2A:
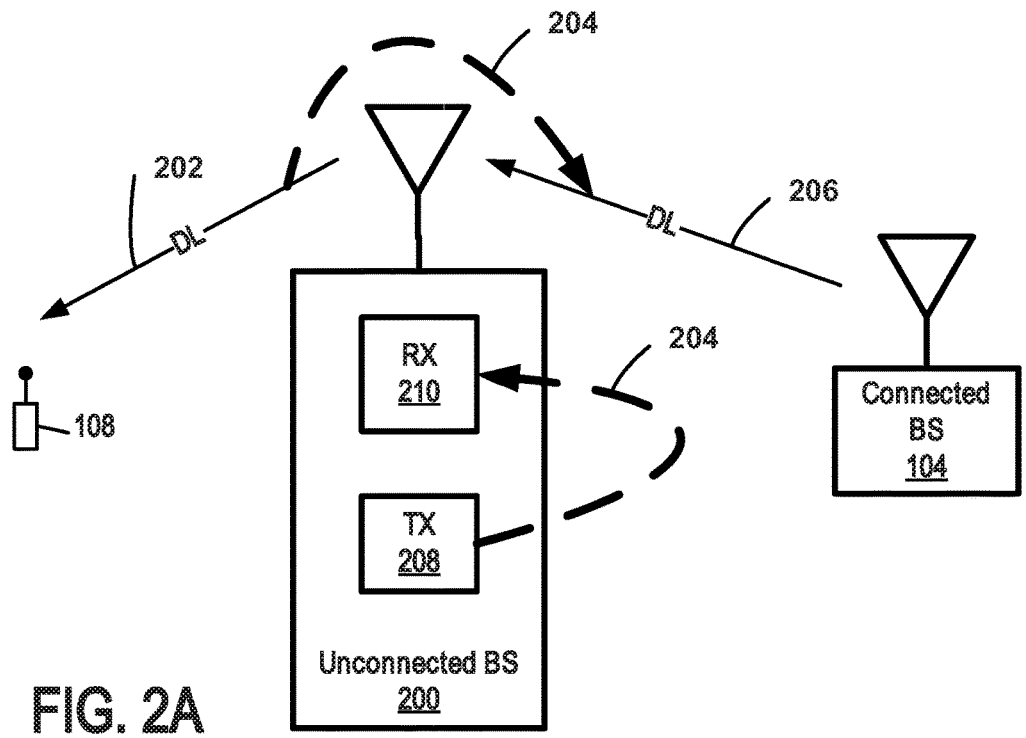
FIG. 2A is a block diagram of the system for an example where transmission, from an unconnected base station, of an access link downlink signal causes self-interference with reception of a downlink backhaul signal transmitted from the connected base station.

FIG. 2A is a block diagram of the system 100 for an example where transmission, from an unconnected base station 200, of an access link downlink signal 202 causes self-interference 204 with reception of a downlink backhaul signal 206 transmitted from the connected base station 104. For the example, the transmission times of the two signals 202, 206 at least partially overlap. In addition, the transmission frequencies of the two signals are the same or are close enough to result in interference. Self-interference occurs when the outgoing transmitted signal transmitted from the transmitter 208 enters the receiver 210. The relatively high power level of the transmitted signal desensitizes the receiver or otherwise interferes with reception. Therefore, for the example of FIG. 2A, the transmission of the access link downlink signal 202 interferes with reception of the downlink backhaul signal 206.

Figure 2B:
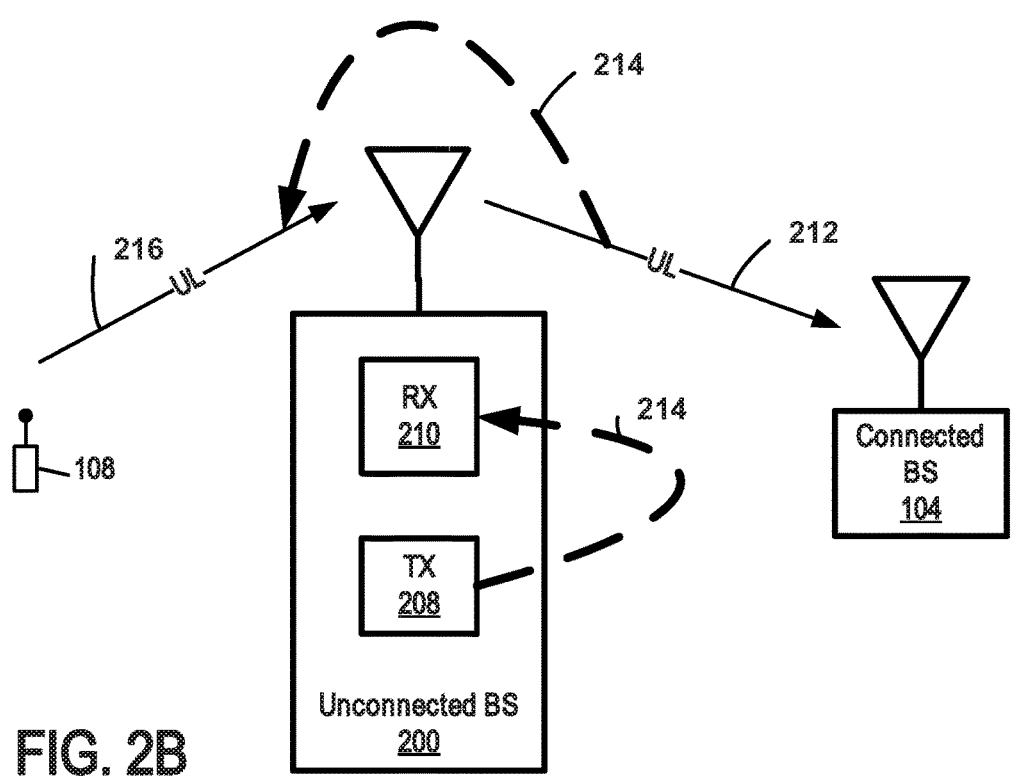
FIG. 2B is a block diagram of the system for an example where transmission, from an unconnected base station, of an uplink backhaul signal causes self-interference with reception of an uplink access link signal transmitted from the UE device.

FIG. 2B is a block diagram of the system 100 for an example where transmission, from an unconnected base station 200, of an uplink backhaul signal 212 causes self-interference 214 with reception of an uplink access link signal 216 transmitted from the UE device 108. For the example, the transmission times of the two signals 212, 216 at least partially overlap. In addition, the transmission frequencies of the two signals are the same or are close enough to result in interference. As explained above, self-interference occurs when the outgoing transmitted signal transmitted from the transmitter 208 enters the receiver 210. The relatively high power level of the transmitted signal desensitizes the receiver or otherwise interferes with reception. Therefore, for the example of FIG. 2B, the transmission of the uplink backhaul signal 212 interferes with reception of the access link uplink signal 216.

As seen from the examples of FIG. 2A and FIG. 2B, communication systems can suffer from self-interference where the access link and backhaul link signals use the same frequency band. In accordance with the invention and the examples herein, however, self-interference is eliminated or at least minimized by selecting transmission times of the access link and backhaul link signals.

Figure 3:
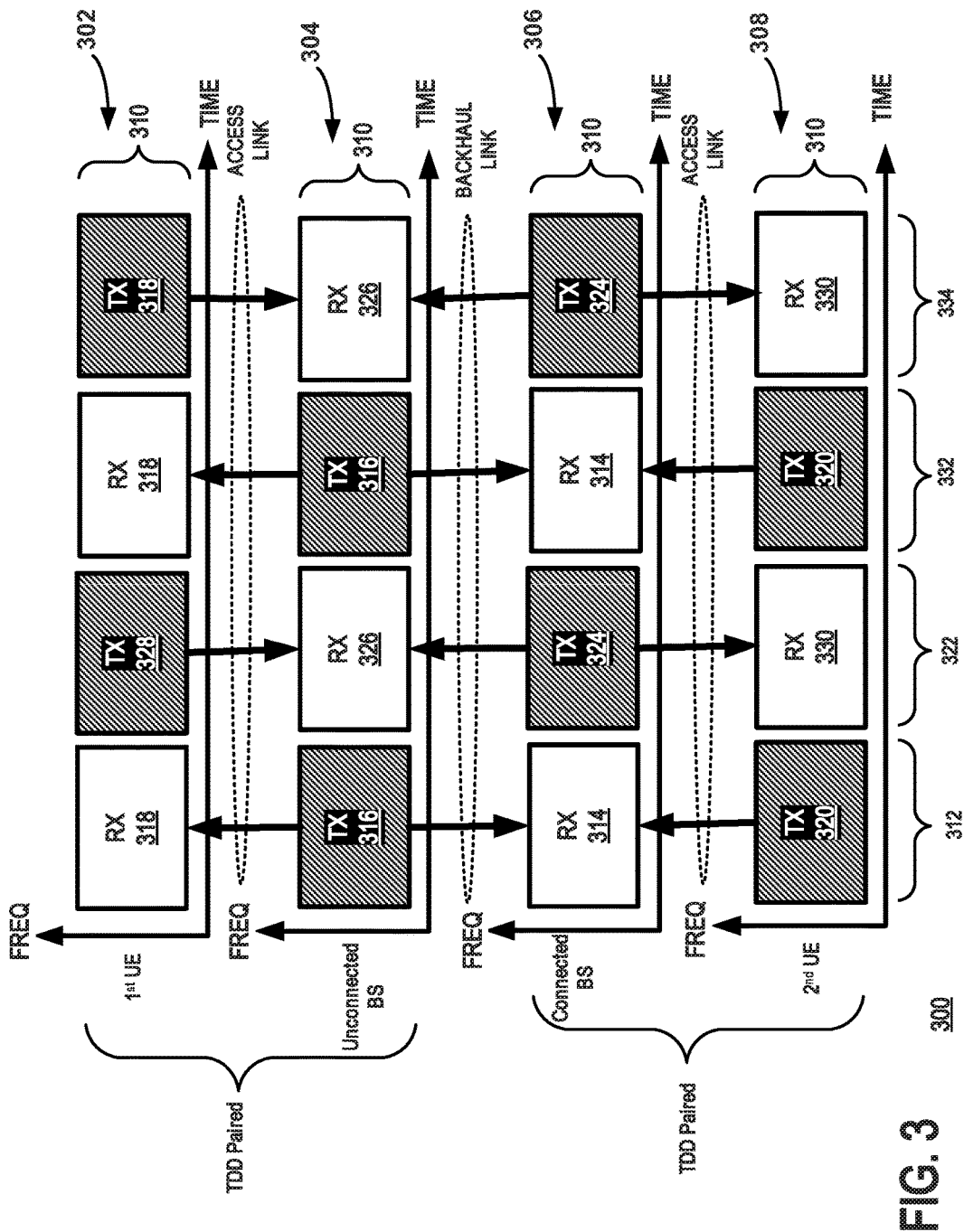
FIG. 3 is an illustration of an example of a signal transmission scheme for a system having a connected base station and an unconnected base station.

FIG. 3 is an illustration of an example of a signal transmission scheme 300 for a system having a connected base station 104 and an unconnected base station 102. The example discussed with reference to FIG. 3 may be applied where the unconnected base station 102 is a repeater base station 132, a relay base station 142, or a self-backhauled base station 144. For the example, the unconnected base station 102 performs transmission and reception at particular times (within frames) such that the unconnected base station 102 is not transmitting any signals when it is receiving signals in the same frequency band. FIG. 3 shows the communication timing (transmission/reception sequence) 302, 304, 306, 308 for four devices in the same frequency band 310. Each communication timing diagram shows transmission times and reception times in the frequency band (or sub-band). The diagrams, therefore, indicate at least a portion of the Time Division Duplex (TDD) configuration of each device where a TDD configuration is the communication timing of transmission and reception times. Each transmission time includes transmission on the access link and transmission on the backhaul link although a transmission time may only occur on one of the two links in some circumstances. Also, each reception time includes reception on the access link and reception on the backhaul link although a reception time may be only involved on one link of the two links in some circumstances.

The example of FIG. 3 may be implemented by any communication system having at least an unconnected base station serving a first UE device and a connected base station serving a second UE device. Examples of communication systems suitable for implementing the example of FIG. 3 include the communications systems discussed with reference to FIG. 1A, FIG. 1B, FIG. 1C, and FIG. 1D. For the example, the unconnected base station communication timing 304 is a transmission/reception sequence for the unconnected base station, the first UE communication timing 302 is a transmission/reception sequence for the first UE device, the connected base station communication timing 306 is a transmission/reception sequence for the connected base station, and the second UE communication timing 308 is a transmission/reception sequence for the second UE device. After determining the TDD configuration of the connected base station and synchronizing to the connected base station, the unconnected base station sets its own TDD configuration to be orthogonal to the connected base station. For example, the TDD configuration of the unconnected base station can be set such that it only transmits signals when the connected base station is in the receive cycle of the TDD cycle for a given frequency band or sub-band. Further, such a configuration may require the unconnected base station to receive signals from all sources within the frequency band when the connected base station is transmitting in the band.

More specifically for the example of FIG. 3, the unconnected base station synchronizes to the connected base station by, for example, receiving the connected base station sync signal. After synchronization, the unconnected base station receives one or more messages from the connected base station that identify the TDD configuration of the connected base station. The TDD configuration is the timing of the transmit and receive frames of the connected base station. The first frame 312 in FIG. 3 is a receive frame 314 for the connected base station. Accordingly, during the first frame 312, the connected base station receives uplink access link signals from UE devices it is serving such as the second UE device and receives any backhaul signals that are transmitted from nearby unconnected base stations. The unconnected base station, therefore, sets a TDD configuration that is orthogonal to the TDD configuration of the connected station. As a result, the unconnected base station is in transmission mode during the first frame 312 during an unconnected base station transmission frame 316. During the unconnected base station transmission frame 316, the unconnected base station transmits uplink backhaul signals to the connected base station and transmits any downlink access link signals to the UE devices that it is serving, such as the first EU device 108. Therefore, during the first frame 312, the first UE device 108 is in receive mode in a receive frame 318, the unconnected base station is in a transmission mode in a transmission frame 316, the connected base station is in a receive mode in a reception frame 314 and the second UE device is in a transmission mode in a transmission frame 320.

In the second frame 322, the connected base station is in transmitting mode and the unconnected base station is in receiving mode. As a result, the connected base station is transmitting to the unconnected base station and UE devices that it is serving in a transmission frame 324 while the unconnected base station is receiving uplink signals from UE devices and backhaul signals from the connected base station in a reception frame 326. The first UE device transmits signals in a transmission frame 328 and the second UE device receives downlink signals in a reception frame 330.

The third frame 330 includes transmission and reception frames similar to the first frame 312. The fourth frame 334 includes transmission and reception frames similar to the second frame 334. For the example of FIG. 3, the frames are the same length and the TDD sequence is an alternating sequence. In some situations, however, the difference sequence patterns can be used and the frames may have different durations.

Figure 4:
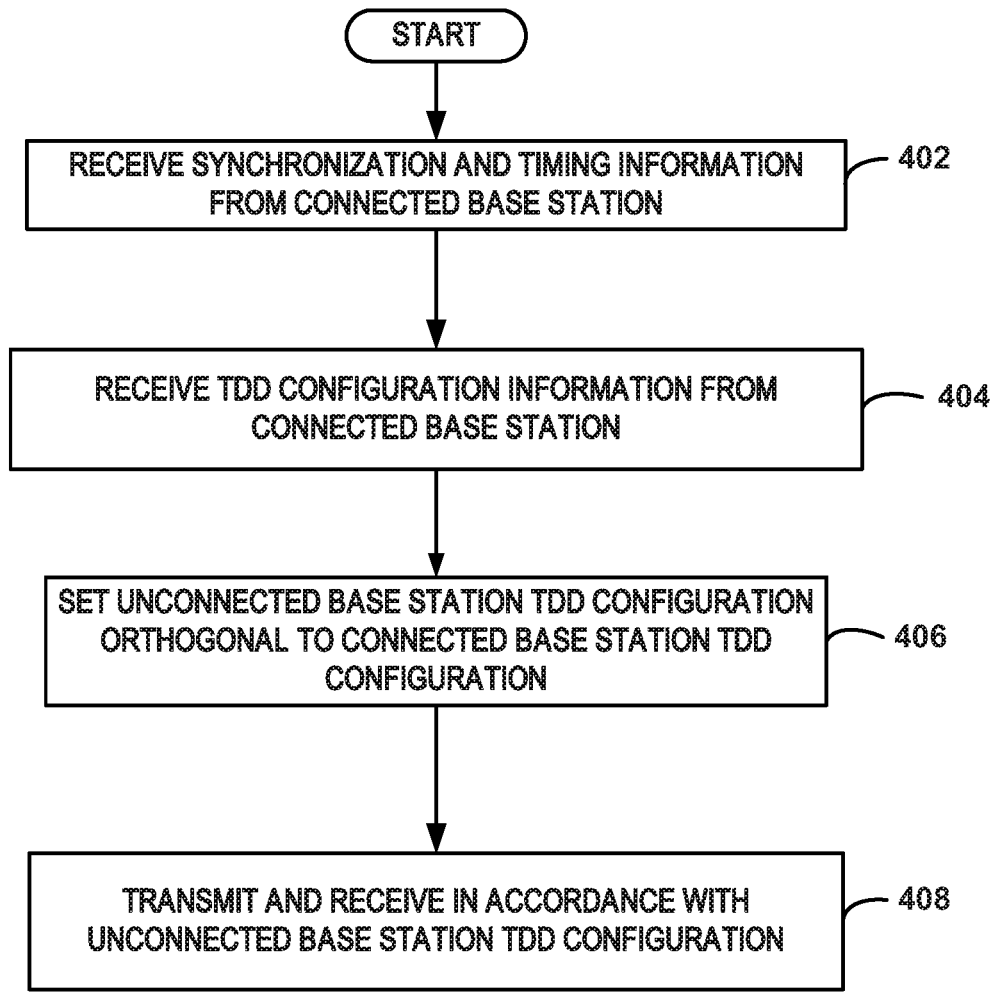
FIG. 4 is a flow chart of method performed at an unconnected base station.

FIG. 4 is a flow chart of a method performed at an unconnected base station 102. The method can be performed at repeater base stations 132, relay base stations 142 and self-backhauled base stations 144.

At step 402, synchronization and timing information is received from a connected base station. For example, the connected base station, such as an anchor base station, transmits a cell Sync signal and provides system timing that is received by the unconnected base station.

At step 404, the TDD configuration information is received form the connected base station. For example, information indicating the TDD sequence can be transmitted in a broadcast message. In one example, the TDD configuration information is transmitted in a System Broadcast Message in accordance with the communication system protocols and standards. The unconnected base station receives the broadcast message and determines the TDD configuration. As a result, the unconnected base station is aware of the transmission and reception times of the connected base station.

At step 406, the unconnected base station TDD configuration is set to be orthogonal to the connected bases station TDD configuration. After determining the connected base station TDD configuration, the unconnected base station sets the transmitted and reception times such that it only receives signals when the connected base station is transmitting and only transmits signals when the connected base station is receiving. At step 408, the unconnected base station applies the unconnected base station TDD configuration to transmit and receive signals. Since the unconnected base station does not receive and transmit information at the same time, self-interference is avoided or at least minimized.

Figure 5:
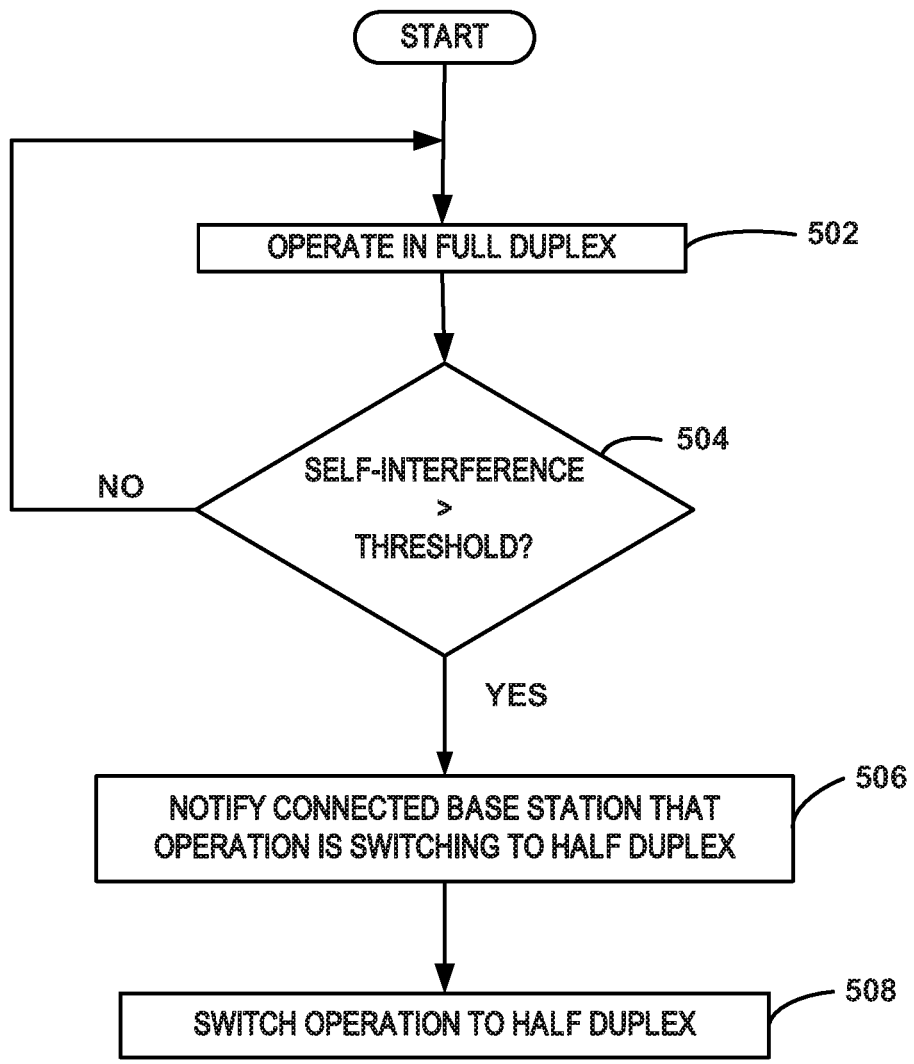
FIG. 5 is a flow chart of a method for managing duplex modes based on self-interference at an unconnected base station.

FIG. 5 is a flow chart of a method for managing duplex modes based on self-interference at an unconnected base station. For the example, the method is performed at self-backhauled base station connected to the connected base station, such as anchor base station, through a wireless backhaul.

At step 502, the self-backhauled base station operates in full duplex mode. The self-backhauled base station may use conventional techniques for minimizing self-interference while operating in full duplex.

At step 504, the self-backhauled base station determines whether self-interference is above a threshold. The self-backhauled base station monitors the level of self-interference while in the full duplex mode. The monitoring may include directly measuring signal energy or power, or may include monitoring communication performance, such as evaluating data error rates. Regardless of the particular monitoring technique, a threshold is selected that corresponds to the maximum self-interference that is to be tolerated at the base station. If the threshold is not exceeded, the base station continues to operate in full duplex. Otherwise, the method proceeds to step 506. In another situation, the self-backhauled base station may determine that to switch to half duplex mode regardless of the measured self-interference. Such a scenario may occur where another base station (such as the connected base station) instructs the self-backhauled base station to switch.

At step 506, the self-backhauled base station notifies the connected base station (anchor base station) that the self-backhauled base station is switching to half duplex operation. An example of a suitable technique for notifying the anchor base station includes sending a message over the backhaul from the self-backhauled base station to the anchor base station. In response to the notification, the anchor base station changes the communication with the self-backhauled base station over the wireless backhaul to half duplex. The transition from full duplex to half duplex may include additional messages between the anchor base station and the self-backhauled base station. For example, information may be exchanged that indicates the timing of the half duplex cycle.

At step 508, the self-backhauled base station operates in half duplex. For example, the method may continue with a procedure in accordance with the method discussed with reference to FIG. 4.

Figure 6A:
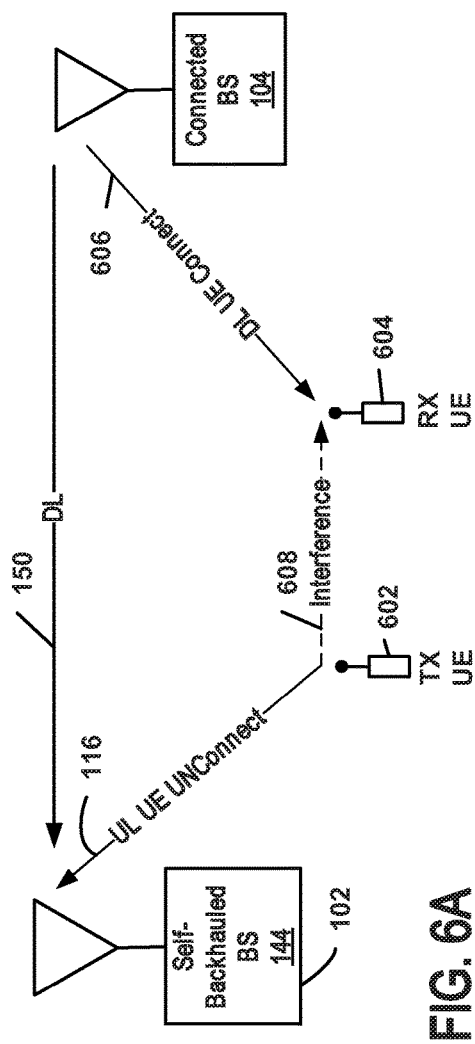
FIG. 6A is a block diagram of the system for a situation where a transmitting UE device served by the unconnected station causes interference at another UE device during a half-duplex half cycle that includes a downlink transmission from the connected base station to the unconnected base station.
Figure 6B:
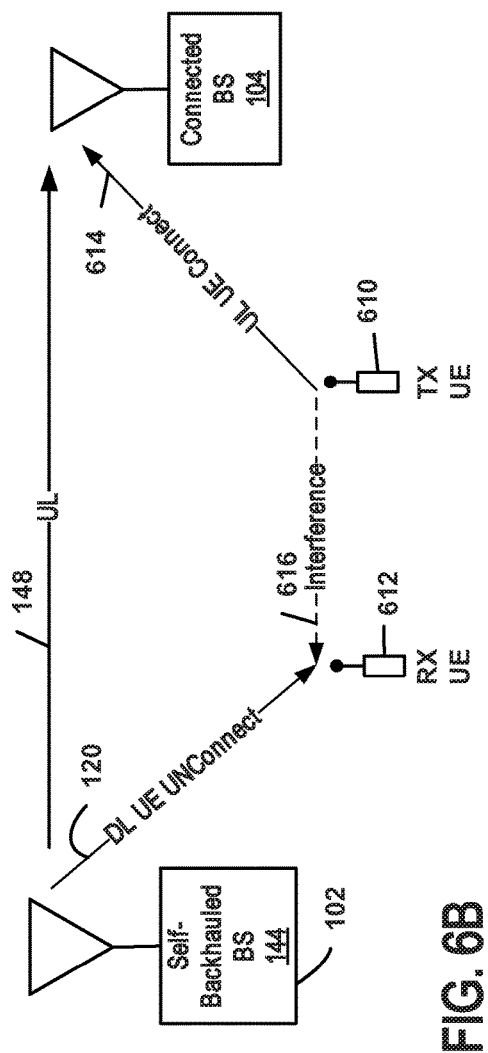
FIG. 6B is a block diagram of the system for a situation where a transmitting UE device served by the connected base station causes interference at another UE device during a half-duplex half cycle that includes an uplink transmission from the unconnected base station to the connected base station.

FIG. 6A and FIG. 6B are block diagrams of the system 100 for situations where one UE device causes interference at another UE device during a half-duplex half cycle. In some situations, it is possible that one UE device is transmitting a signal to its serving base station at the same time a second UE device is receiving a signal from its serving base station. Interference will occur where the signal transmitted from the transmitting UE device has a sufficiently high power level at the receiving UE device as compared to the signal at the same frequency being received by receiving UE device. FIG. 6A is a block diagram for the example where the half duplex cycle includes the downlink transmission 150 from the connected base station 104 to the unconnected base station 102. A transmitting UE device 602 is served by an unconnected base station 103, such as a self-backhauled base station, and a receiving UE device 604 is served by a connected base station 104, such as an anchor base station. Accordingly, during the half duplex cycle, the transmitting UE 602 is transmitting an uplink signal 116 to the self-backhauled base station 144 and the receiving UE device 604 is receiving a downlink signal 606 from the connected base station 104. In certain situations, the power level of the uplink signal 116 as received at the receiving UE device 604 is sufficiently high to cause interference 608 with the down link signal 606 transmitted from the anchor base station 104 and being received by the receiving UE device 604. For example, where the receiving UE device 604 is relatively close to the transmitting UE device 602 but is relatively distant from the anchor base station 104, the uplink signal 116 may interfere with the downlink signal 606 if the two signals are transmitted with the same frequency, sub-band, or channel.

For the example of FIG. 6B, the transmitting UE device 610 is served by the anchor base station 104 and the receiving UE device 612 is served by the self-backhauled base station 144. As a result, the uplink signal 614 transmitted by the transmitting UE device 610 to the anchor base station 104 may cause interference 616 with the downlink signal 120 being received by the receiving UE device 612 from the self-backhauled UE device.

In some situations, interference reduction techniques performed at the receiving UE device may eliminate, or at least reduce the interference to a tolerable level. For example, an advanced receiver, such as a successive interference cancellation (SIC) receiver at the receiving UE device can process the incoming signals to reduce the impact of the uplink signal interference. Other techniques, however, may be employed where the receiving UE device does not include an advanced receiver or the advanced receiver is unable to sufficiently reduce the interference. Some examples of suitable techniques are discussed below.

FIG. 7A is a block diagram for an example where UE device interference 608 is reduced by communication resource management. For the example, the receiving UE device is served by the connected base station 104 and is experiencing interference 608 due to transmissions 116 of a transmitting UE device 602. For the example, the receiving UE device 604 reports the interference in an interference reporting communication 702. The interference reporting communication 702 may include a single message or may include multiple transmissions. In addition, messages may be transmitted from the connected base station 104 to facilitate the interference reporting communication 702 in some situations.

Based on the interference information received from the receiving UE device 604, a scheduler 704 schedules communication resources to eliminate, or at least, reduce the interference 608. The scheduler 704 at least determines the frequency or frequencies at which the receiving UE device 604 is experiencing the interference 608 and schedules resources to avoid transmission of the downlink signal 606 and the same frequency as the transmission of the uplink signal 116. In some situations, the scheduler 704 is a central scheduler that schedules communication resources to the connected base station 104 and the self-backhauled base station 144. In such situations, the scheduler 704 can manage the uplink resources of the transmitting UE device 602, the downlink resources of the receiving UE device 604, or both.

In some circumstances, the communication resources of the self-backhauled base station 144 may be scheduled by a different and separate scheduler from the scheduler 704. The resources of the two base stations may be scheduled jointly by the two schedulers in some situations. If the scheduler 704 does not have any control of the resources of the self-backhauled base station, the scheduler 704 reduces interference by managing the downlink resources used for the downlink signal 606.

FIG. 7B is a block diagram for an example where UE device interference 616 is reduced using a central scheduler 704. For the example, the receiving UE device 612 is served by the self-backhauled base station 144 and is experiencing interference 616 due to transmissions 614 of a transmitting UE device 610. The receiving UE device 612 reports the interference 616 in an interference reporting communication 706. The interference reporting communication 706 may include a single message or may include multiple transmissions. In addition, messages may be transmitted from the self-backhauled base station 144 to facilitate the interference reporting communication 706 in some situations. For the example of FIG. 7B, the self-backhauled base station 144 forwards information indicative of the interference reporting communication 706 in another interference reporting communication 708 to the scheduler 704 through the wireless backhaul and the connected base station 104. In the case of common control signaling the signal 706 can be received at the connected base station 104.

Based on the interference information received from the receiving UE device 612, the scheduler 704 schedules communication resources to eliminate, or at least, reduce the interference 616. The scheduler 704 at least determines the frequency or frequencies at which the receiving UE device 612 is experiencing the interference 616 and schedules resources to avoid transmission of the downlink signal 120 and the same frequency as the transmission of the uplink signal 614. Since the scheduler 704 is a central scheduler that schedules communication resources to the connected base station 104 and the self-backhauled base station 144 for the example, the scheduler 704 can manage the uplink resources of the transmitting UE device 610, the downlink resources of the receiving UE device 612, or both.

Figure 7C:
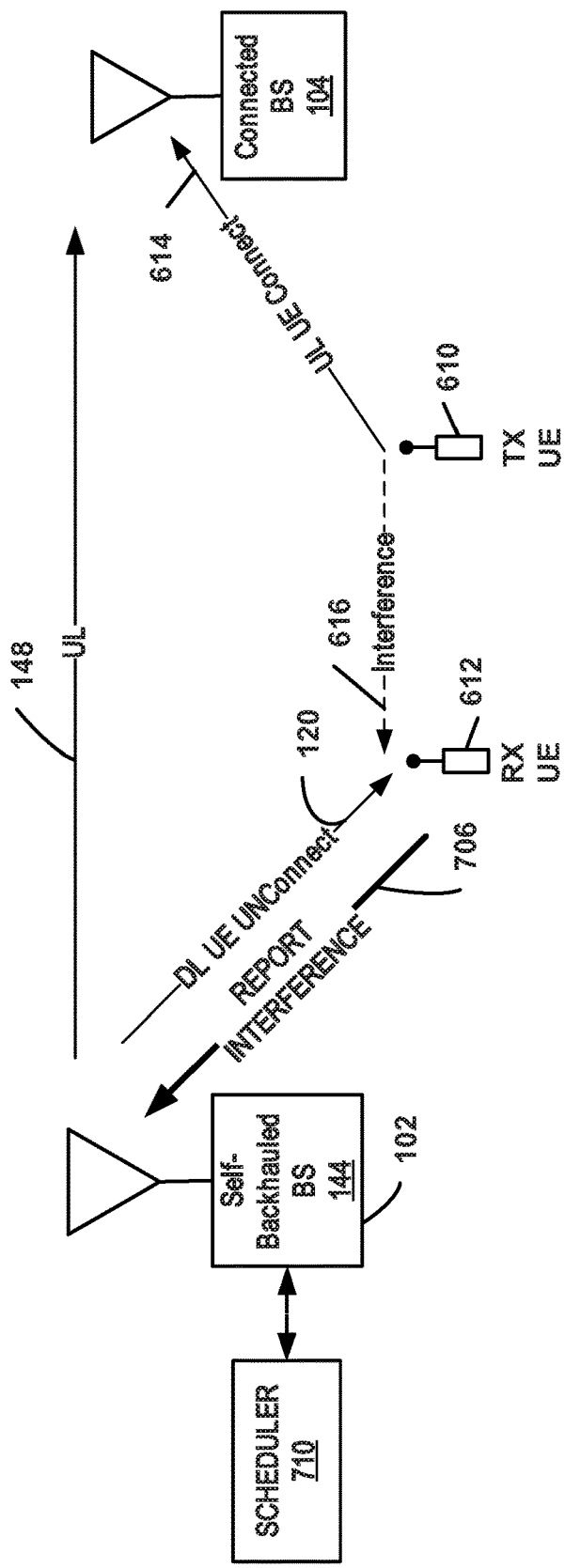
FIG. 7C is a block diagram for an example where UE device interference is reduced using a local scheduler connected to the self-backhauled base station.

FIG. 7C is a block diagram for an example where UE device interference 616 is reduced using a local scheduler 710 connected to the self-backhauled base station 144. For the example, the receiving UE device 612 is served by the self-backhauled base station 144 and is experiencing interference 616 due to transmissions 614 of a transmitting UE device 610. The receiving UE device 612 reports the interference 616 in an interference reporting communication 706. The interference reporting communication 706 may include a single message or may include multiple transmissions. In addition, messages may be transmitted from the self-backhauled base station 144 to facilitate the interference reporting communication 706 in some situations. For the example of FIG. 7C, the self-backhauled base station 144 and the scheduler 710 schedules the resources used by the self-backhauled base station 144 and a central scheduler is not used to dynamically schedule resources. Based on the interference information received from the receiving UE device 612, the scheduler 710 schedules communication resources to eliminate, or at least, reduce the interference 616. The scheduler 710 at least determines the frequency or frequencies at which the receiving UE device 612 is experiencing the interference 616 and schedules the downlink resources to avoid transmission of the downlink signal 120 and the same frequency as the transmission of the uplink signal 614.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. An unconnected base station not directly connected to a core network, the unconnected base station comprising:
   a receiver configured to receive time division duplex (TDD) configuration information from a connected base station directly connected to a core network, the TDD configuration information indicating a transmission and reception schedule of the connected base station; and
   a transmitter,
   the unconnected base station applying an unconnected base station TDD configuration to the transmitter and the receiver such that the transmitter is configured to transmit first downlink signals to a first user equipment (UE) device when the connected base station is receiving first uplink signals from a second UE device and the receiver is configured to receive second uplink signals from the first UE device when the connected base station is transmitting second downlink signals to the second UE device, the transmitter configured to transmit first backhaul signals to the connected base station when the connected base station is receiving the first uplink signals from the second UE device.

2. The unconnected base station of claim 1, wherein the transmitter and receiver are configured to operate in a full duplex mode, the unconnected base station configured to apply the unconnected base station TDD configuration to the transmitter and receiver to switch from full duplex mode to half duplex mode by applying the unconnected base station TDD configuration when a level of self-interference at the unconnected base station exceeds a threshold.

3. The unconnected base station of claim 1, wherein the transmitter and receiver are configured to operate in a full duplex mode, the unconnected base station configured to apply the unconnected base station TDD configuration to the transmitter and receiver to switch from full duplex mode to half duplex mode by applying the unconnected base station TDD configuration in response to a message received from the connected base station.

4. The unconnected base station of claim 1, wherein the receiver is further configured to receive second backhaul signals from the connected base station when the connected base station is transmitting the second downlink signals to the second UE device.

5. The unconnected base station of claim 1, wherein the receiver is further configured to receive synchronization signals from the connected base station to obtain synchronization information.

6. The unconnected base station of claim 1, wherein the unconnected base station is a repeater base station.

7. The unconnected base station of claim 1, wherein the unconnected base station is a relay base station.

8. The unconnected base station of claim 1, wherein the unconnected base station is a self-backhauled base station.

9. A method performed at an unconnected base station not directly connected to a core network, the method comprising:
receiving a connected base station time division duplex (TDD) configuration information from a connected base station directly connected to a core network, the connected base station TDD configuration information indicating a transmission and reception schedule of the connected base station;
determining an unconnected base station TDD configuration; and
applying the unconnected base station TDD configuration to the unconnected base station such that the unconnected base station transmits first downlink signals to a first user equipment (UE) device when the connected base station is receiving first uplink signals from a second UE device, the unconnected base station receives second uplink signals from the first UE device when the connected base station is transmitting second downlink signals to the second UE device, and the unconnected base station transmits first backhaul signals to the connected base station when the connected base station is receiving the first uplink signals from the second UE device.

10. The method of claim 9, further comprising applying the unconnected base station TDD configuration to the unconnected base station such that the unconnected base station receives second backhaul signals from the connected base station when the connected base station is transmitting the second downlink signals to the second UE device.

11. The method of claim 9, further comprising receiving synchronization signals from the connected base station to obtain synchronization information.

12. The method of claim 9, wherein the unconnected base station is a repeater base station.

13. The method of claim 9, wherein the unconnected base station is a relay base station.

14. The method of claim 9, wherein the unconnected base station is a self-backhauled base station.

15. The method of claim 9, further comprising:
operating in a full duplex mode where first backhaul signals are received at the unconnected base station when the first downlink signals are being transmitted;
determining that self-interference at the unconnected base station is above a threshold; and
in response to determining that the self-interference is above the threshold, switching to half duplex mode by applying the unconnected base station TDD configuration to the unconnected base station such that the unconnected base station transmits first downlink signals to the first user equipment (UE) device when the connected base station is receiving first uplink signals from the second UE device, the unconnected base station receives the second uplink signals from the first UE device when the connected base station is transmitting the second downlink signals to the second UE device, and the unconnected base station transmits first backhaul signals to the connected base station when the connected base station is receiving the first uplink signals from the second UE device.

16. A communication system comprising:
a connected base station directly connected to a core network; and
an unconnected base station not directly connected to the core network, the unconnected base station comprising:
a receiver configured to receive time division duplex (TDD) configuration information from the connected base station, the TDD configuration information indicating a transmission and reception schedule of the connected base station; and
a transmitter, the unconnected base station applying an unconnected base station TDD configuration to the transmitter and the receiver such that:
the transmitter is configured to transmit first downlink signals to a first user equipment (UE) device when the connected base station is receiving first uplink signals from a second UE device;
the transmitter is configured to transmit first backhaul signals to the connected base station when the connected base station is receiving the first uplink signals from the second UE device; and
the receiver is configured to receive second uplink signals from the first UE device when the connected base station is transmitting second downlink signals to the second UE device, the TDD configuration of the unconnected base station based on the TDD configuration of the connected base station.

17. The system of claim 16, wherein:
the receiver is further configured to receive second backhaul signals from the connected base station when the connected base station is transmitting the second downlink signals to the second UE device.

18. The system of claim 16, wherein the receiver is further configured to receive synchronization signals from the connected base station to obtain synchronization information.

19. The system of claim 16, wherein the unconnected base station is one of a repeater base station, a relay base station, or a self-backhauled base station.

20. The system of claim 16, further comprising a scheduler, wherein the receiver is further configured to receive interference information from the first UE device, the interference information indicative of interference at the first UE device caused by an interfering uplink signal transmitted from a connected UE device served by the connected base station, the scheduler configured to schedule at least one of uplink resources for transmitting the interfering uplink signal and the downlink resources for transmitting the first downlink signals to the first UE device such that the interfering uplink signal is transmitted at an uplink frequency different from a downlink frequency of the first downlink signals.

* * * * *